(12) United States Patent
Krebs et al.

(10) Patent No.: US 11,403,761 B2
(45) Date of Patent: Aug. 2, 2022

(54) PROBABILISTIC MOTION MODEL FOR GENERATING MEDICAL IMAGES OR MEDICAL IMAGE SEQUENCES

(71) Applicants: Siemens Healthcare GmbH, Erlangen (DE); Institut National de Recherche en Informatique et en Automatique, Le Chesnay (FR)

(72) Inventors: Julian Krebs, Moers (DE); Tommaso Mansi, Plainsboro, NJ (US); Herve Delingette, La Colle sur Loup (FR); Nicholas Ayache, Nice (FR)

(73) Assignees: Siemens Healthcare GmbH, Erlangen (DE); Institut National de Recherche en Informatique et en Automatique, Le Chesnay (FR)

( * ) Notice: Subject to any disclaimer, the term of this patent is extended or adjusted under 35 U.S.C. 154(b) by 109 days.

(21) Appl. No.: 16/834,269

(22) Filed: Mar. 30, 2020

(65) Prior Publication Data
US 2020/0311940 A1 Oct. 1, 2020

Related U.S. Application Data

(60) Provisional application No. 62/827,356, filed on Apr. 1, 2019.

(51) Int. Cl.
*G06T 7/00* (2017.01)
*G06T 7/246* (2017.01)
*G06T 7/70* (2017.01)

(52) U.S. Cl.
CPC ............ *G06T 7/0016* (2013.01); *G06T 7/246* (2017.01); *G06T 7/70* (2017.01); *G06T 2207/20084* (2013.01); *G06T 2207/30004* (2013.01)

(58) Field of Classification Search
CPC ......... G06T 7/0016; G06T 7/246; G06T 7/70; G06T 2207/20084; G06T 2207/30004
USPC ...................................................... 382/128
See application file for complete search history.

(56) References Cited

U.S. PATENT DOCUMENTS

| | | | |
|---|---|---|---|
| 10,176,388 B1 * | 1/2019 | Ghafarianzadeh | G06V 20/58 |
| 2005/0275747 A1 * | 12/2005 | Nayar | H04N 5/2355 348/E5.035 |
| 2012/0010513 A1 * | 1/2012 | Wong | G06V 20/693 600/165 |
| 2017/0308992 A1 * | 10/2017 | Chalom | G06V 10/462 |

OTHER PUBLICATIONS

Vetter et al., Linear Object and Image synthesis From a single Example Image, Jul. 1997, IEEE, pp. 733-742 (Year: 1997).*

(Continued)

*Primary Examiner* — Wednel Cadeau

(57) ABSTRACT

Systems and methods for performing a medical imaging analysis task using a machine learning based motion model are provided. One or more medical images of an anatomical structure are received. One or more feature vectors are determined. The one or more feature vectors are mapped to one or more motion vectors using the machine learning based motion model. One or more deformation fields representing motion of the anatomical structure are determined based on the one or more motion vectors and at least one of the one or more medical images. A medical imaging analysis task is performed using the one or more deformation fields.

13 Claims, 6 Drawing Sheets

(56) References Cited

OTHER PUBLICATIONS

Vetter et al., Linear Object and Image synthesis From a single Example Image, Jul. 1997, IEEE (Year: 1997).*
CSE579 WEB: (Computer vision chapter 9 Motion from 2D Image Sequences, University of Washington, 2000, Paul G. Allen School of Computer Science & Engineering, (Year: 2000).*
3. Vetter et al., Linear Object and Image Synthesis from a Single Example Image, Jul. 1997, IEEE (Year: 1997).*
Avants et al., "Symmetric diffeomorphic image registration with cross-correlation: evaluating automated labeling of elderly and neurodegenerative brain", Medical Image Analysis, 2008, vol. 12, No. 1, pp. 26-41.
Bai et al., "An empirical evaluation of generic convolutional and recurrent networks for sequence modeling", arXiv preprint arXiv:1803.01271 (2018), 14 pgs.
Bernard et al., "Deep learning techniques for automatic MRI cardiac multi-structures segmentation and diagnosis: Is the problem solved?", IEEE Transactions on Medical Imaging, 2018, vol. 37, No. 11, pp. 2514-2525.
De Craene et al., "Temporal diffeomorphic freeform deformation: Application to motion and strain estimation from 3d echocardiography", Medical Image Analysis, 2012, vol. 16, No. 2, 37 pgs.
Kingma et al., "Semi-supervised learning with deep generative models", Advances in Neural Information Processing Systems, arXiv preprint arXiv:1406.5298 (2014), pp. 1-9.
Krebs et al, "Learning a probabilistic model for diffeomorphic registration", IEEE Transactions on Medical Imaging, arXiv preprint arXiv:11812.0746 (2019), vol. 38, pp. 1-16.
Lorenzi et al., "LCC-Demons: a robust and accurate symmetric diffeomorphic registration algorithm", NeuroImage, Elsevier, 2013, vol. 81, 9 pgs.
Qin et al., "Joint learning of motion estimation and segmentation for cardiac MR image sequences", International Conference on Medical Image Computing and Computer-Assisted Intervention, Springer, arXiv preprint arXiv:1806.04066(2018), 9 pgs.
Rohé et al, "Low-dimensional representation of cardiac motion using barycentric subspaces: A new group-wise paradigm for estimation, analysis, and reconstruction", Medical image Analysis, Elsevier, 2018, vol. 45, pp. 1-12.
Shi et al., "Temporal sparse free-form deformations", Medical Image Analysis, 2013, vol. 17, No. 7, 11 pgs.

* cited by examiner

Receive one or more medical images of an anatomical structure
302

Determine one or more feature vectors
304

Map the one or more feature vectors to one or more motion vectors using a machine learning based motion model
306

Determine one or more deformation fields representing motion of the anatomical structure based on the one or more motion vectors and at least one of the one or more medical images
308

Perform a medical imaging analysis task using the one or more deformation fields
310

Output results of the medical imaging analysis task
312

PROBABILISTIC MOTION MODEL FOR GENERATING MEDICAL IMAGES OR MEDICAL IMAGE SEQUENCES

CROSS-REFERENCE TO RELATED APPLICATIONS

This application claims the benefit of U.S. Provisional Application No. 62/827,356, filed Apr. 1, 2019, the disclosure of which is herein incorporated by reference in its entirety.

TECHNICAL FIELD

The present invention relates generally to motion analysis, understanding, and synthesis of medical images, and more particularly to a probabilistic motion model for generating medical images or medical image sequences.

BACKGROUND

In medical imaging analysis, medical images are analyzed by performing various medical imaging analysis tasks to assess, for example, organ function or pathology progression. One important medical imaging analysis task is motion analysis of an organ to analyze geometric changes and motion patterns of the organ in an image sequence. Such motion analysis may be performed to assess heart function for diagnosing cardiovascular diseases or to evaluate disease evolution over time.

Conventionally, motion analysis is performed by deformably registering images to compute deformation fields that track the motion of structures between the images. However, a major difficulty in such conventional motion analysis is extracting consistent temporal deformations. To address this difficulty, registration algorithms have been proposed with temporal regularization. While such registration algorithms with temporal regularization can produce accurate deformation fields in time, they do not extract intrinsic motion parameters that uniquely characterize the underlying organ motion and can be used to model and understand various motion patterns. Biomechanical models have also been proposed to model motion. However, such biomechanical models either lack realism or are very difficult to personalize for a given subject.

BRIEF SUMMARY OF THE INVENTION

In accordance with one or more embodiments, systems and methods for performing a medical imaging analysis task using a machine learning based motion model are provided. One or more medical images of an anatomical structure are received. One or more feature vectors are determined. The one or more feature vectors are mapped to one or more motion vectors using the machine learning based motion model. One or more deformation fields representing motion of the anatomical structure are determined based on the one or more motion vectors and at least one of the one or more medical images. A medical imaging analysis task is performed using the one or more deformation fields.

In one embodiment, each of the one or more feature vectors are mapped to one or more motion vectors using information from the mapping of feature vectors determined from prior and/or future images in the one or more medical images. Each respective feature vector may be mapped to the one or more motion vectors based on a relative time associated with the medical image from which the respective feature vector was determined.

In one embodiment, the one or more medical images comprise a plurality of medical images and the one or more feature vectors are determined by encoding pairs of the plurality of medical images to determine the one or more feature vectors using an encoding network of the machine learning based motion model.

In one embodiment, the one or more medical images comprise a single medical image, the one or more feature vectors are determined by sampling the one or more feature vectors from a prior distribution, and the medical imaging analysis task comprises image synthesis to generate a generated medical image from the single medical image.

In one embodiment, the one or more medical images comprise a plurality of medical images and the medical imaging analysis task comprises image registration to align the plurality of medical images.

In one embodiment, the one or more medical images comprise a plurality of medical images and the medical imaging analysis task comprises sequence interpolation to generate a medical image temporally occurring between two images of the plurality of medical images.

In one embodiment, the one or more medical images comprise a plurality of medical images and the medical imaging analysis task comprises sequence extrapolation to generate a medical image temporally occurring after a last image of the plurality of medical images.

In one embodiment, the machine learning based motion model comprises an encoding network, a temporal convolutional network, and a decoding network.

These and other advantages of the invention will be apparent to those of ordinary skill in the art by reference to the following detailed description and the accompanying drawings.

BRIEF DESCRIPTION OF THE DRAWINGS

FIG. 3 shows a method for generating medical images using a motion model, in accordance with one or more embodiments;

DETAILED DESCRIPTION

The present invention generally relates to methods and systems for learning a probabilistic motion model for image registration, image synthesis and sequence interpolation (e.g., temporal hyper-resolution) and extrapolation (e.g. sequence prediction). Embodiments of the present invention are described herein to give a visual understanding of such methods and systems for learning a probabilistic motion model. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Further, it should be understood that while the embodiments discussed herein may be discussed with respect to generating predicted medical images for medical image sequences, the present invention is not so limited. Embodiments of the present invention may be applied for generating predicted images of any type.

In medical imaging analysis, motion analysis is performed on medical image sequences in order to quantify motion of anatomical structures in the medical image sequences. The motion of anatomical structures in a medical image sequence may be represented by deformation fields $\phi_t$, often assumed to be diffeomorphic, but not only. In accordance with one or more embodiments, a probabilistic motion model is trained to learn a motion representation, henceforth called a motion matrix, that captures the relevant underlying motion features in medical image sequences. Once trained, the probabilistic motion model may be applied to, e.g., calculate the deformation fields $\phi_t$ between the images of a sequence, predict the deformation for non-observed motion to generate a complete image sequence from a single image (motion simulation), or to generate missing images between images of an image sequence (motion interpolation). Advantageously, the trained probabilistic motion model may be used in various medical image analysis tasks, such as, e.g., spatio-temporal registration, tracking, and motion compensation.

Figure 1:
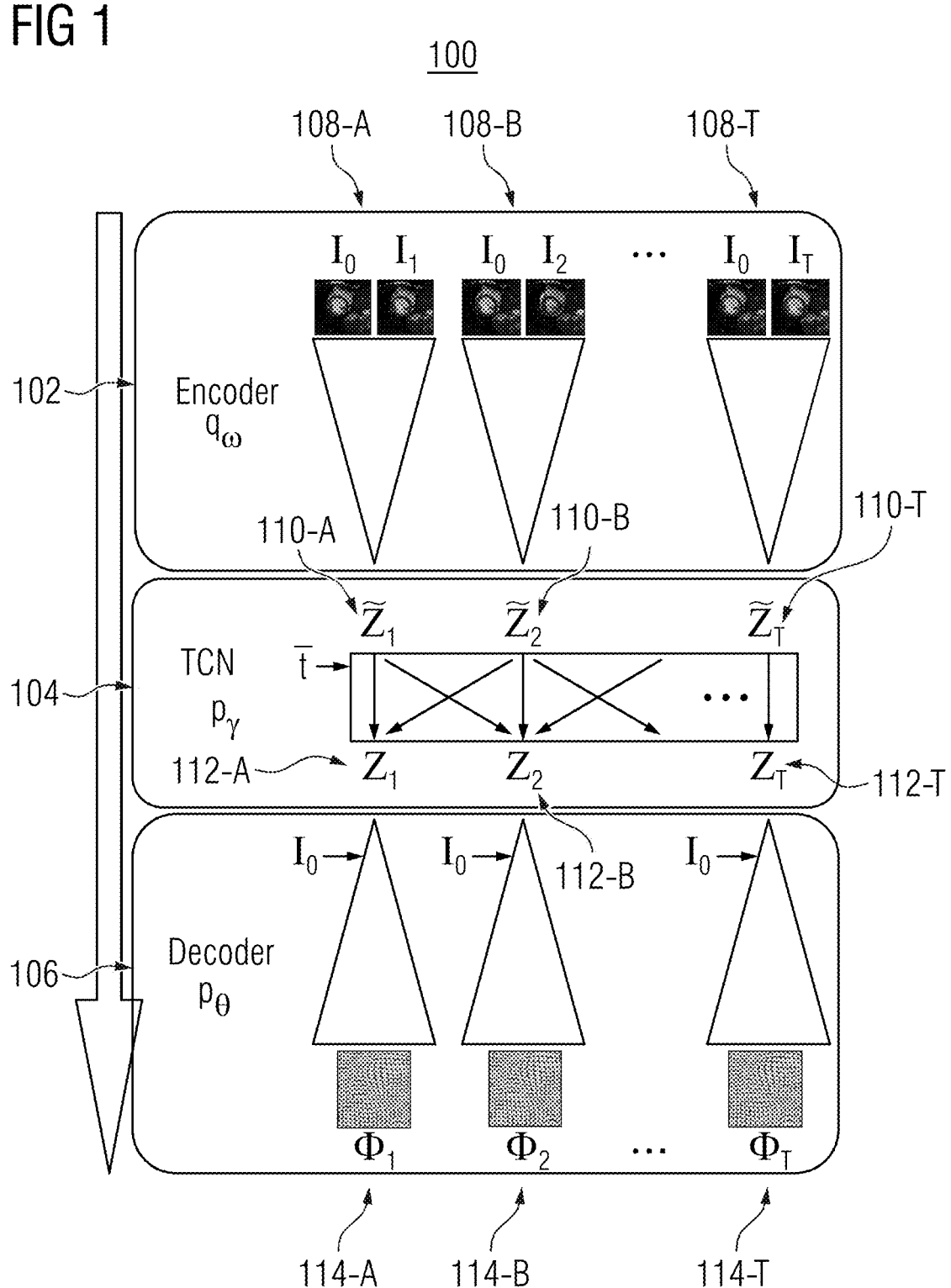
FIG. 1 shows a network architecture of a motion model, in accordance with one or more embodiments.

FIG. 1 shows a network architecture 100 of a machine learning based motion model, in accordance with one or more embodiments. The motion model comprises an encoder network $q_\omega$ 102, a temporal convolutional network $p_\gamma$ 104, and a decoder network $p_\theta$ 106. Encoder network $q_\omega$ 102 and decoder network $p_\theta$ 106 may form a convolutional autoencoder.

The motion model is trained using an unsupervised learning approach directly from training medical image sequences during an offline or training stage to learn a motion matrix that captures relevant underlying motion features in the training medical image sequences. Such motion features represent the intrinsic motion characteristics seen within the training medical image sequences and the motion depicted therein. The training medical image sequences may be time sequences of medical images (or frames) acquired using any suitable imaging modality. For example, the training medical image sequences may be sequences of magnetic resonance (MR) images, computed tomography (CT) images, ultrasound images, x-ray images, or medical images acquired using any other medical imaging modality or combinations of medical imaging modalities. The training medical image sequences may be sequences of 2D medical images or 3D medical images (volumes). The medical image sequence may be a sequence of medical images of region or object of interest, such as, e.g., a particular organ (e.g., heart, lungs, etc.) or other anatomical structure or a region of the body of the patient (e.g., cardiac images, abdominal images, etc.). The medical image sequence may be received directly from an image acquisition device, such as an MR scanner, CT scanner, ultrasound scanner, etc., as the medical image sequence of the patient is acquired, or can be received by loading a previously acquired medical image sequence of the patient from a storage or memory of a computer system or receiving a medical image that has been transmitted from a remote computer system.

The encoder network $q_\omega$ 102 receives training image pairs 108-A, 108-B, ..., 108-T (collectively referred to as training image pairs 108) of a training medical image sequence with T+1 frames. As shown in FIG. 1, each training image pair 108 comprises moving image $I_0$ and a respective fixed image $I_t$ of the training medical image sequence, where $t \in [1,T]$. Encoder network $q_\omega$ 102 independently encodes the training image pairs 108 into respective low dimensional feature vectors $\tilde{z}_1$ 110-A, $\tilde{z}_2$ 110-B, ..., $\tilde{z}_t$ 110-T (collectively referred to as feature vectors $\tilde{z}_t$ 110) in the latent space. Temporal convolutional network (TCN) $p_\gamma$ 104 jointly maps each feature vector $\tilde{z}_t$ 110 to a respective motion vector $z_1$ 112-A, $z_2$ 112-B, ..., $z_T$ 112-T (collectively referred to as motion vectors $z_t$ 112) to generate motion matrix z. Decoder network $p_\theta$ 106 determines respective deformation fields $\phi_1$ 114-A, $\phi_2$ 114-B, ..., $\phi_T$ 114-T (collectively referred to as deformation fields $\phi_1$ 114) from motion vectors $z_t$ 112. Deformation fields $\phi_1$ 114 represent motion between the training image pairs 108 and may be diffeomorphic. Deformation fields $\phi_1$ 114 may be applied by decoder network $p_\theta$ 106 to transform moving image $I_0$ to reconstruct respective fixed images $I_t$. It should be noted that this procedure performs a temporal registration of the first frame (e.g., the moving image $I_0$) in the medical image sequence with the remaining frames of the medical sequence (e.g., the fixed images $I_t$) in one shot.

Encoder network $q_\omega$ 102, temporal convolutional network $p_\gamma$ 104, and decoder network $p_\theta$ 106 may be implemented by three neural networks with trainable parameters ω, γ, and θ, respectively. During the training, a lower bound on the data likelihood is maximized with respect to a prior distribution $p(\tilde{z}_t)$ of the motion vector $\tilde{z}_t$. Prior distribution $p(\tilde{z}_t)$ is assumed to follow a multivariate unit Gaussian distribution with spherical covariance $I: p(\tilde{z}_t) \sim \mathcal{N}(0,I)$. The expected log-likelihood of $p_\theta$ is optimized with the Kullback-Leibler (KL) divergence enforcing the posterior distribution $q_\omega$ to be close to the prior distribution $p(\tilde{z}_t)$ for all time steps in the objective function of Equation 1:

$$\Sigma_{t=1}^T \mathbb{E}_{z_t \sim p_\gamma(\cdot|\tilde{z}_{1:T},I_{1:T})}[\log p_\theta(I_t|z_t,I_0)] - \mathrm{KL}[q_\omega(\tilde{z}_t|I_0,I_t) \| p(\tilde{z}_t)] \quad \text{Equation 1}$$

The log-likelihood term of $p_\theta$ may be modelled as a symmetric local cross-collection distribution with the weighting factor λ. Encoder network $q_\omega$ 102 and decoder network $p_\theta$ 106 share their weights across all time steps. Their network architecture comprises an exponentiation layer for the stationary velocity field parameterization of diffeomorphic deformation fields, a linear warping layer, and diffusion-like regularization with smoothing parameters $\sigma_G$ and $\sigma_T$.

Encoder network $q_\omega$ 102 and decoder network $p_\theta$ 106 are independent of time. However, in one embodiment, temporal convolutional network $p_\Gamma$ 104 temporally conditions the mapping of each feature vector $\tilde{z}_t$ 110 to a respective motion vector $z_t$ 112. Temporal convolutional network $p_\gamma$ 104 comprises multiple 1-D convolutional layers with increasing dilation. Temporal convolutional network $p_\gamma$ 104 may receive as input image sequences of different lengths during training and testing.

Figure 2:
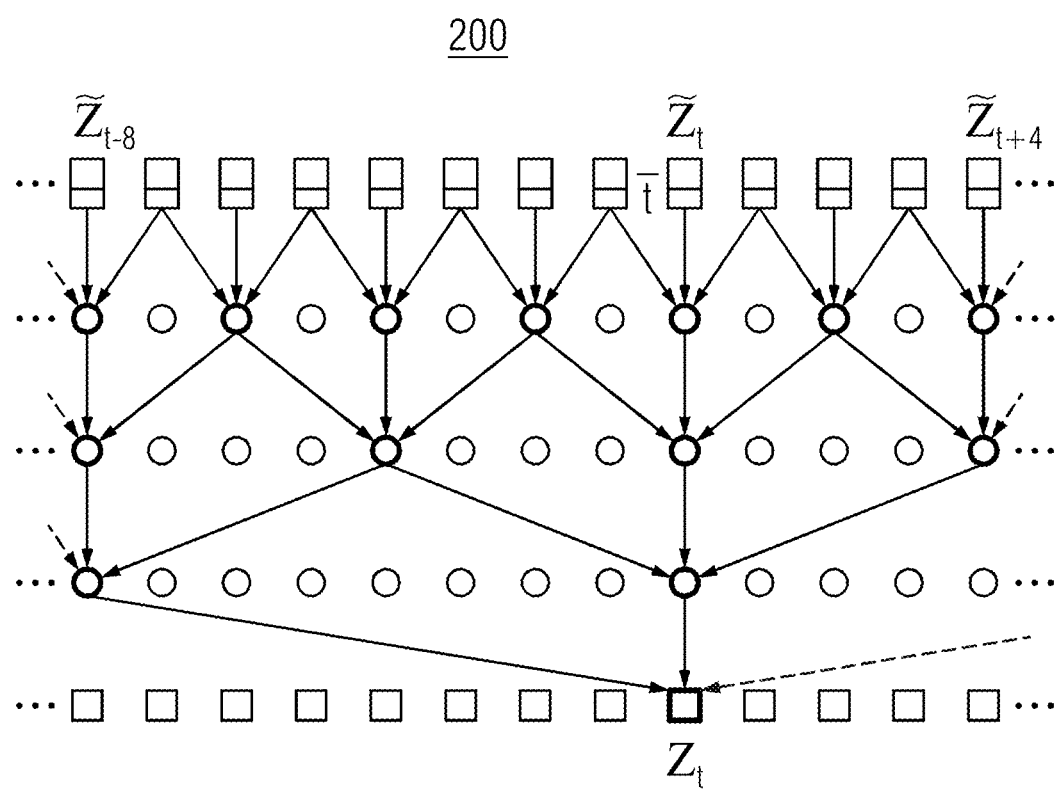
FIG. 2 shows a temporally conditioned mapping of a feature vector to a motion vector, in accordance with one or more embodiments.

FIG. 2 illustratively depicts a temporally conditioned mapping 200 of feature vector $\tilde{z}_t$ to motion vector $z_T$ by a temporal convolutional network, in accordance with one or more embodiments. As shown in FIG. 2, the mapping of feature vector $\tilde{z}_t$ to motion vector $z_T$ is performed using information from all other feature vectors by merging information of mappings from prior and future time steps. In one embodiment, the feature vector $\tilde{z}_t$ comprises a normalized time indication representing a relative time associated with the medical image from which the feature vector $\tilde{z}_t$ was encoded relative to other medical images in the medical image sequence. In one embodiment, the normalized time indication may be $\bar{t}=t/T$, where t represents the frame number of the medical image from which feature vector $\tilde{z}_t$ is encoded from and T represents the total number of medical images in the medical image sequence. Providing the normalized time indication with the feature vector $\tilde{z}_t$ explicitly provides the temporal convolutional network with information on where the medical image, from which the feature vector $\tilde{z}_t$ is encoded, is located within the medical image sequence. Non-causal convolutional layers may be used to take future time steps into account. The temporal convolutional network is implemented using zero-padding and skip connections, with each layer comprising d filters.

In one embodiment, motion model 100 may be trained with temporal dropout sampling. Training the motion model by optimizing Equation 1 may result in learning an identity transformation $z \approx \tilde{z}$ in the temporal convolutional network such that deformations of the current time step are independent of past and future time steps. To avoid this and force the motion model to search for temporal dependencies during training, temporal dropout sampling is applied. In temporal dropout sampling, at least some of the feature vector $\tilde{z}_t$ is sampled from a prior distribution $p(\tilde{z}_t)$, instead of only from the posterior distribution $q(\tilde{z}_t|I_0,I_t)$. At the time steps at which the prior distribution $p(\tilde{z}_t)$ is sampled to determine feature vector $\tilde{z}_t$, motion model 100 has no knowledge of the target image $I_t$ and is therefore forced to use the temporal connections in the temporal convolutional network in order to minimize the objective (Equation 1).

According to temporal dropout sampling, at each time step t, a sample from the prior distribution $\tilde{z}_t^{prior} \sim p(\tilde{z}_t)$ may be selected instead of a sample from the posterior sample $\tilde{z}_t^{post} \sim q_\omega(\tilde{z}_t|I_0,I_t)$ using a Bernoulli random variable $r_t$. All independent Bernoulli random variables $r \in \mathbb{R}^T$ have the success probability $\delta$. The feature vector $\tilde{z}_t$ can be defined as:

$$\tilde{z}_t = r_t * \tilde{z}_t^{prior} + (1-r_t) * \tilde{z}_t^{post} \qquad \text{Equation 2}$$

Once trained, the motion model may applied during an online or testing stage to perform medical imaging analysis tasks, such as, e.g., image registration, image synthesis, sequence interpolation (e.g., temporal hyper-resolution), and sequence extrapolation (e.g. sequence prediction). FIG. 3 shows a method 300 for performing a medical imaging analysis task using a machine learning based motion model, in accordance with one or more embodiments. The steps of method 300 may be performed by one or more suitable computing devices, such as, e.g., computer 602 of FIG. 6.

At step 302, one or more medical images of an anatomical structure is received. The anatomical structure may include, e.g., organs, bones, vessels, or any other anatomical object of interest of a patient. In one embodiment, the anatomical structure is a moving anatomical structure.

The one or more medical images may be a single image or a plurality of images, such as, e.g., a sequence of medical images. The one or more medical images may be of any suitable modality, such as, e.g., MRI, CT, ultrasound, x-ray, or any other modality or combination of modalities, and may be 2D or 3D medical images. The one or more medical images may be received directly from an image acquisition device, such as an MR scanner, CT scanner, etc., as the medical image sequence of the patient is acquired, or can be received by loading a previously acquired medical image sequence of the patient from a storage or memory of a computer system or receiving a medical image that has been transmitted from a remote computer system.

At step 304, one or more feature vectors are determined. In one embodiment, the one or more of the feature vectors are determined from the one or more medical images by inputting pairs of the one or more medical images into an encoder network of the machine learning based motion model. One example of the encoder network is encoder network $q_\omega$ 102 of FIG. 1. Each image pair is separately encoded by the encoder network into a respective feature vector. The feature vectors represent low dimensional encodings of the motion between the image pairs in the latent space. In another embodiment, one or more of the feature vectors are determined by randomly sampling a prior distribution. For example, the feature vectors may be determined by randomly sampling the prior distribution where the one or more medical images comprises a single image and a target image is not available.

At step 306, the one or more feature vectors are mapped to one or more motion vectors using the machine learning based motion model. In one embodiment, is the mapping is performed by a temporal convolutional network of the machine learning based motion model. An example of a temporal convolutional network is temporal convolutional network $p_\gamma$ 104 of FIG. 1. In one embodiment, each of the feature vectors are jointly mapped to a respective motion vector to temporally condition the mapping. The mapping may be temporally conditioned by merging information of mappings from prior and future time steps or by including a normalized time indication with each of the feature vectors (e.g., by concatenating the feature vectors with the normalized time indication). The normalized time indication represents a relative time associated with the medical image from which the feature vector was determined relative to other medical images in the medical image sequence.

At step 308, one or more deformation fields representing motion of the anatomical structure is determined based on the one or more motion vectors and at least one of the one or more medical images. In one embodiment, the deformation fields are determined using a decoder network of the machine learning based motion model. One example of the decoder network is decoder network $p_\theta$ 106 of FIG. 1. The decoder network decodes the one or more motion vectors to the one or more deformation fields, conditioned on the at least one of the one or more medical images to provide anatomical context.

At step 310, a medical imaging analysis task is performed using the one or more deformation fields.

In one embodiment, the medical imaging analysis task is image registration. Given a plurality of medical images as the one or more medical images, the plurality of medical images may be registered using the deformation fields. The deformation fields represent the transformation that aligns the plurality of medical images.

In one embodiment, the medical imaging analysis task is image synthesis. Given a single medical image as the one or more medical images, image synthesis is performed to generate a generated medical image or sequence of medical images. Accordingly, the one or more feature vectors are determined at step 304 by randomly sampling a prior distribution, and the encoding network of the machine learning based motion model is not used during the online stage in this embodiment. Image synthesis is performed by applying the one or more deformation fields to transform the medical image to generate the generated medical image or a sequence of medical images. The generated medical images depicts non-observed motion. Non-observed motion refers to motion not depicted in the one or more medical images.

In one embodiment, the medical imaging analysis task is sequence interpolation. Given a sequence of medical images as the one or more medical images, sequence interpolation is performed to generate a medical image temporally occurring between two images of the sequence. Sequence interpolation is performed by applying the deformation fields to a particular image in the sequence of medical images to generate a generated medical image temporally occurring after that particular image. The generated medical image depicts non-observed motion occurring between the two images of the sequence.

In one embodiment, the medical imaging analysis task is sequence extrapolation. Given a sequence of medical images as the one or more medical images, sequence extrapolation is performed to generate a medical image temporally occurring after the last image in the sequence. Sequence extrapolation is performed by applying the deformation fields to a last image in the sequence of medical images to generate a generated medical image temporally occurring after the last image. The generated medical image depicts non-observed motion occurring after the last image of the sequence.

At step 312, results of the medical imaging analysis task are output. The results of the medical imaging analysis task may include, e.g., deformation fields representing a transformation aligning the one or more medical images for image registration or one or more generated medical images for image synthesis, sequence interpolation, and sequence extrapolation, The results of the medical imaging analysis task can be output by displaying the results of the medical imaging analysis task on a display device of a computer system, storing the results of the medical imaging analysis task on a memory or storage of a computer system, or by transmitting the results of the medical imaging analysis task to a remote computer system.

The proposed motion model in accordance with embodiments of the present invention were experimentally validated using cardiac MRI-cine data. Temporally consistent registration was demonstrated by evaluating motion tracking and compensation of the cardiac sequence, and end-diastolic to end-systolic (ED-ES) registration results were compared with pair-wise registration. Motion sampling and interpolation were also performed to reconstruct motion with a limited number of frames.

The experimental validation was performed using 334 short-axis sequences acquired from different hospitals, mixing congenital heart diseases with healthy and pathological images from adults. The medical image sequence length T varied from 14 to 35 images. 100 sequences that included ED-ES segmentation information were used for testing while remaining sequences were used for training. All slices were resampled with a spacing of 1.5×1.5 mm and cropped to a size of 128×128 pixels.

The encoder and decoder networks were implemented with a single-scale architecture. The TCN was implemented with four layers with dilation (1, 2, 4, 8) and a kernel size of 3. The regularization parameters $\sigma_G$ and $\sigma_T$ were set to 3 and 1.5 mm respectively. The loss weighting factor $\lambda$ was chosen empirically as 60 k. The deformation encoding size d was set to 32. The dropout sampling probability $\delta$ was 0.5. The Adam optimization method was applied with a learning rate of 0.0005 and a batch size of one. Data augmentation was performed by randomly shifting, rotating, scaling, and mirroring training sequences. The motion model was implemented in Tensorflow with Keras.

Figure 4:
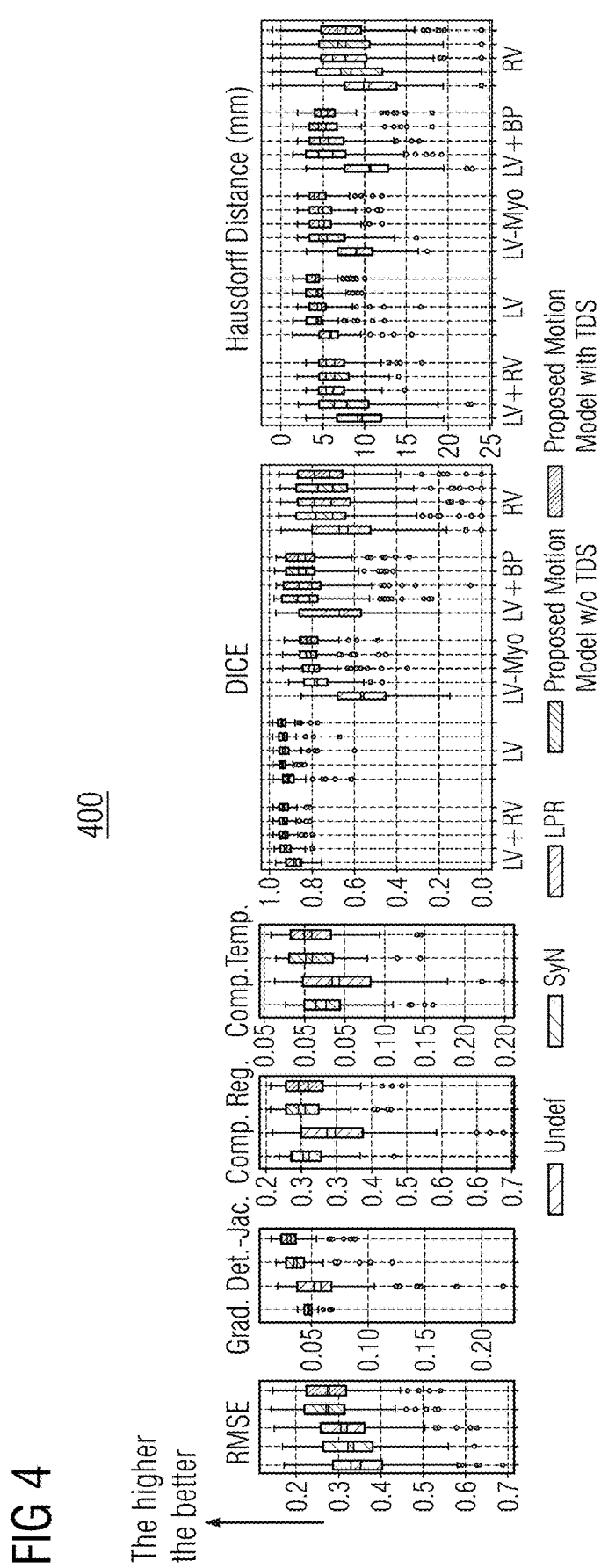
FIG. 4 shows a comparison of results of a motion model in accordance with one or more embodiments and known techniques.

The proposed motion model was evaluated with and without temporal dropout sampling (TDS) and was compared with two registration methods: the symmetric non-rigid registration (SyN) algorithm and the learning-based probabilistic registration (LPR) algorithm. FIG. 4 shows a comparison 400 of results for registering an undeformed (Undef.) image, results of the SyN algorithm, results of the learning-based probabilistic registration algorithm, and results of the proposed motion model with and without TDS, respectively shown in various graphs of FIG. 4 from left to right. Comparison 400 evaluates the root mean square error (RMSE), the gradient of the Jacobian determinant (Grad. Det.-Jac.), and the motion compensation errors (Comp. Reg. and Comp. Temp.) for the data using the central slice. The compensation losses are defined as the sum-of-squared pixel differences of the myocardium area between the ED frame and all $I_t$ (Comp. Reg.) and between all $(I_T, I_{T-1})$ pairs (Comp. Temp.) representing the temporal consistency. The DICE scores and 95 percentile Hausdorff distances (HD in mm) were also reported on five anatomical structures: myocardium (LV-Myo) and epicardium (LV-Epi) of the left ventricle, left bloodpool (LV-BP), right ventricle (RV) and LV+RV. The DICE scores and HD were evaluated on ED-ES frame pairs only, as the ground truths were available. The mean DICE score of the proposed motion model was 84.6% (84.2% without TDS) while the SyN and LPR algorithms reached 83.0% and 83.3% respectively. The proposed motion model reached a mean HD of 5.7 mm (5.7 mm without TDS) while SyN reached 6.4 mm and LPR 5.9 mm. There are no significant differences between the proposed motion model trained with and without TDS. This indicates that registration accuracy does not suffer when using TDS with the same number of training iterations.

Figure 5:
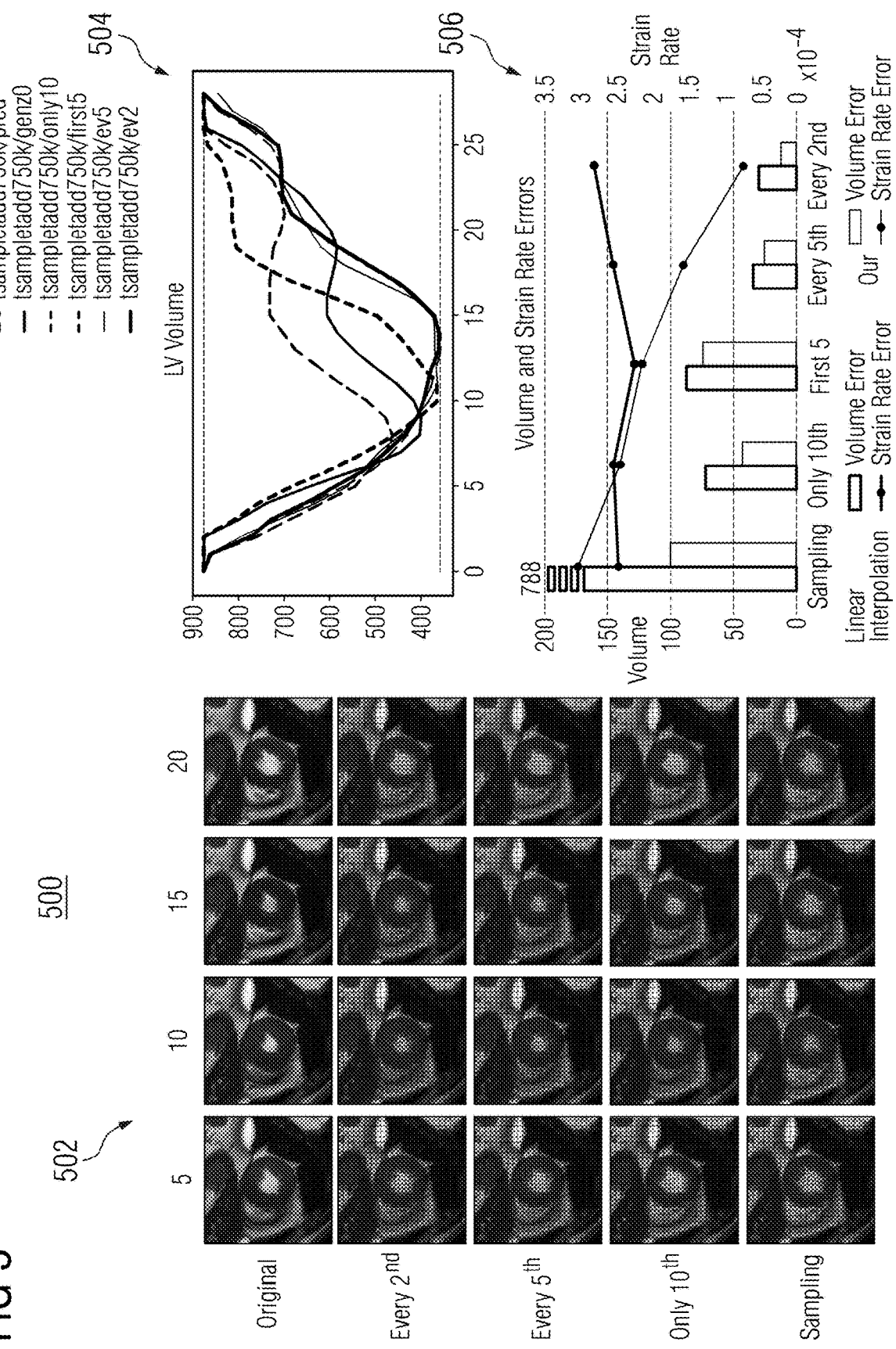
FIG. 5 shows a comparison of results of a motion model in accordance with one or more embodiments using varying subsets of images.

Motion sampling and interpolation using the proposed motion model were also evaluated. The simulated reconstructed motion was visualized by providing the model with different subsets of images from the original sequence. In the time steps without frames, the motion matrix z is created by sampling $\tilde{z}$ from the prior distribution. FIG. 5 shows a comparison 500 of results the proposed motion model using varying subsets of images. Images 502 show a comparison of the original image with predicted medical images generated using every second frame, every fifth frame, only the $10^{th\ frame}$, and no frame (sampling). Graph 504 shows a comparison of LV volume and graph 506 shows a comparison of volume and strain rate errors. Compared to linear interpolation, the proposed motion model's improved performance in recovering the LV volume and myocardial strain rate can be seen in the cases of every second and every fifth frame. When providing only one additional frame ($10^{th}$ frame), the proposed motion model estimates the deformation accurately for these frames and provides plausible cardiac motion patterns for the remaining time steps. The motion simulation given only one frame does not overlap with the original motion which is not intended. The cardiac specific motion patterns, such as the plateau phase before the atrial systole, can be seen.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 3. Certain steps or functions of the methods and workflows described herein, including one or more of the steps or functions of FIG. 3, may be performed by a server or by another processor in a network-based cloud-computing system. Certain steps or functions of the methods and workflows described herein, including one or more of the steps of FIG. 3, may be performed by a client computer in a network-based cloud computing system. The steps or functions of the methods and workflows described herein, including one or more of the steps of FIG. 3, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
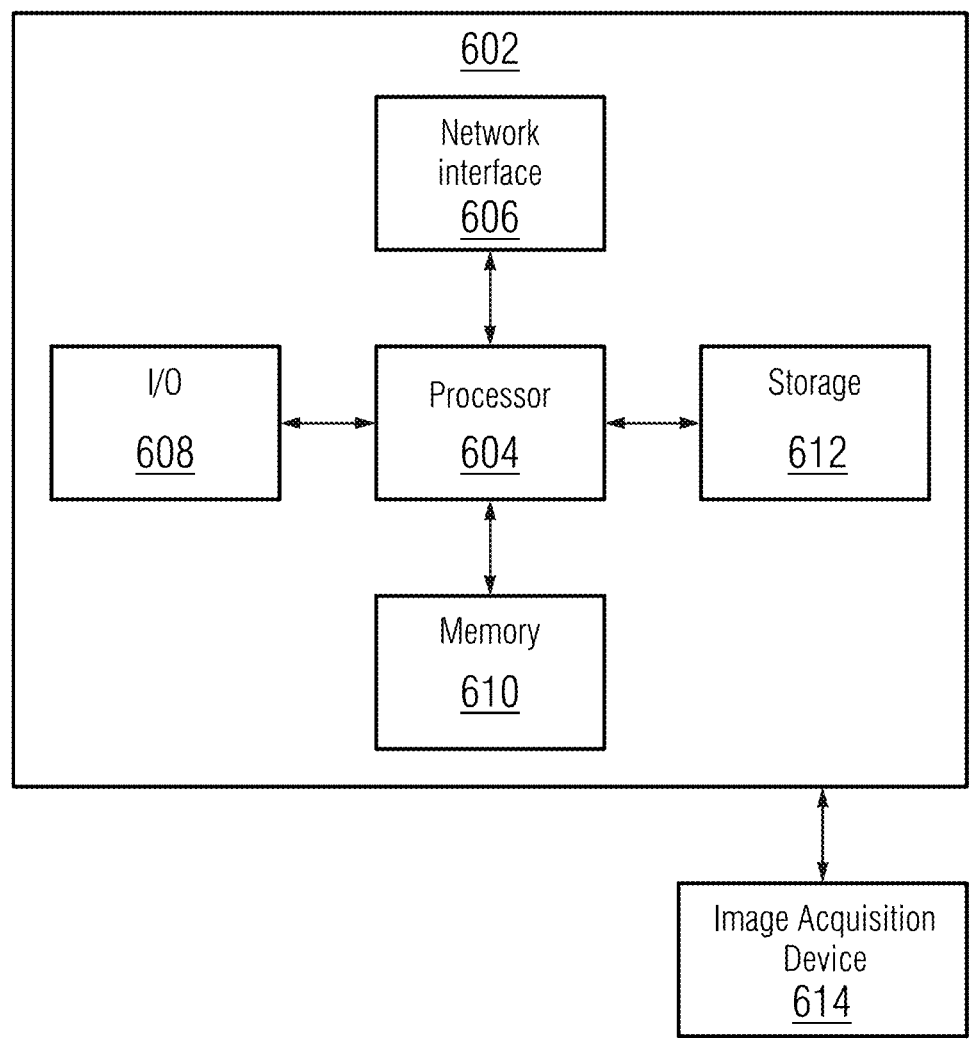
FIG. 6 shows a high-level block diagram of a computer.

A high-level block diagram of an example computer 602 that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIG. 3 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIG. 3. Accordingly, by executing the computer program instructions, the processor 604 executes the method and workflow steps or functions of FIG. 3. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

An image acquisition device 614 can be connected to the computer 602 to input image data (e.g., medical images) to the computer 602. It is possible to implement the image acquisition device 614 and the computer 602 as one device. It is also possible that the image acquisition device 614 and the computer 602 communicate wirelessly through a network. In a possible embodiment, the computer 602 can be located remotely with respect to the image acquisition device 614.

Any or all of the systems and apparatus discussed herein, including elements of workstation 102 of FIG. 1, may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving a sequence of medical images of an anatomical structure;
   determining a plurality of feature vectors from the sequence of medical images;
   jointly mapping each respective feature vector of the plurality of feature vectors to a motion vector using a trained machine learning based motion model based on 1) a relative time associated with the medical image from which the respective feature vector was determined relative to times associated with the remaining images of the sequence of medical images and 2) information from the mapping of the feature vectors determined from prior and future images of the sequence of medical images;
   determining a plurality of deformation fields representing motion of the anatomical structure based on the motion vectors and at least one image of the sequence of medical images; and
   performing a medical imaging analysis task using the plurality of deformation fields.

2. The method of claim 1, wherein determining a plurality of feature vectors from the sequence of medical images comprises:
   encoding pairs of the sequence of medical images to determine the plurality of feature vectors using an encoding network of the machine learning based motion model.

3. The method of claim 1, wherein performing a medical imaging analysis task using the plurality of deformation fields comprises performing image registration to align the sequence of medical images.

4. The method of claim 1, wherein performing a medical imaging analysis task using the plurality of deformation fields comprises performing sequence interpolation to generate a medical image temporally occurring between two images of the sequence of medical images.

5. The method of claim 1, wherein performing a medical imaging analysis task using the plurality of deformation fields comprises performing sequence extrapolation to generate a medical image temporally occurring after a last image of the sequence of medical images.

6. The method of claim 1, wherein the machine learning based motion model comprises an encoding network, a temporal convolutional network, and a decoding network.

7. An apparatus, comprising:
   means for receiving a sequence of medical images of an anatomical structure;
   means for determining a plurality of feature vectors from the sequence of medical images;
   means for jointly mapping each respective feature vector of the plurality of feature vectors to a motion vector using a trained machine learning based motion model based on 1) a relative time associated with the medical image from which the respective feature vector was determined relative to times associated with the remaining images of the sequence of medical images and 2) information from the mapping of the feature vectors determined from prior and future images of the sequence of medical images;
   means for determining a plurality of deformation fields representing motion of the anatomical structure based on the motion vectors and at least one image of the sequence of medical images; and
   means for performing a medical imaging analysis task using the plurality of deformation fields.

8. The apparatus of claim 7, wherein the means for determining a plurality of feature vectors from the sequence of medical images comprises:
   means for encoding pairs of the sequence of medical images to determine the plurality of feature vectors using an encoding network of the machine learning based motion model.

9. The apparatus of claim 7, wherein the machine learning based motion model comprises an encoding network, a temporal convolutional network, and a decoding network.

10. A non-transitory computer readable medium storing computer program instructions, the computer program instructions when executed by a processor cause the processor to perform operations comprising:
    receiving a sequence of medical images of an anatomical structure;
    determining a plurality of feature vectors from the sequence of medical images;
    jointly mapping each respective feature vector of the plurality of feature vectors to a motion vector using a trained machine learning based motion model based on 1) a relative time associated with the medical image from which the respective feature vector was determined relative to times associated with the remaining images of the sequence of medical images and 2) information from the mapping of the feature vectors determined from prior and future images of the sequence of medical images;
    determining a plurality of deformation fields representing motion of the anatomical structure based on the motion vectors and at least one image of the sequence of medical images; and
    performing a medical imaging analysis task using the plurality of deformation fields.

11. The non-transitory computer readable medium of claim 10, wherein performing a medical imaging analysis task using the plurality of deformation fields comprises performing image registration to align the sequence of medical images.

12. The non-transitory computer readable medium of claim 10, wherein performing a medical imaging analysis task using the plurality of deformation fields comprises performing sequence interpolation to generate a medical image temporally occurring between two images of the sequence of medical images.

13. The non-transitory computer readable medium of claim 10, wherein performing a medical imaging analysis task using the plurality of deformation fields comprises performing sequence extrapolation to generate a medical image temporally occurring after a last image of the sequence of medical images.

* * * * *